W. I. BIRDZELL.
LOADER FRAME.
APPLICATION FILED MAY 11, 1915.

1,174,472.

Patented Mar. 7, 1916.
2 SHEETS—SHEET 1.

Inventor
W. I. Birdzell.
By
H. A. Stacey,
Attorneys

W. I. BIRDZELL.
LOADER FRAME.
APPLICATION FILED MAY 11, 1915.

1,174,472.

Patented Mar. 7, 1916.
2 SHEETS—SHEET 2.

Inventor
W. I. Birdzell.

By
Attorneys

UNITED STATES PATENT OFFICE.

WILLIAM I. BIRDZELL, OF INDIANOLA, ILLINOIS.

LOADER-FRAME.

1,174,472.

Specification of Letters Patent.

Patented Mar. 7, 1916.

Application filed May 11, 1915. Serial No. 27,389.

*To all whom it may concern:*

Be it known that I, WILLIAM I. BIRDZELL, a citizen of the United States, residing at Indianola, in the county of Vermilion and State of Illinois, have invented certain new and useful Improvements in Loader-Frames, of which the following is a specification.

This invention is a loader frame which is especially adapted for moving a load into a wagon and which may be easily arranged for use as a derrick.

The invention is illustrated in the accompanying drawings and consists in certain novel features which will be first fully described and then more particularly pointed out in the claims following the description.

Figure 3:
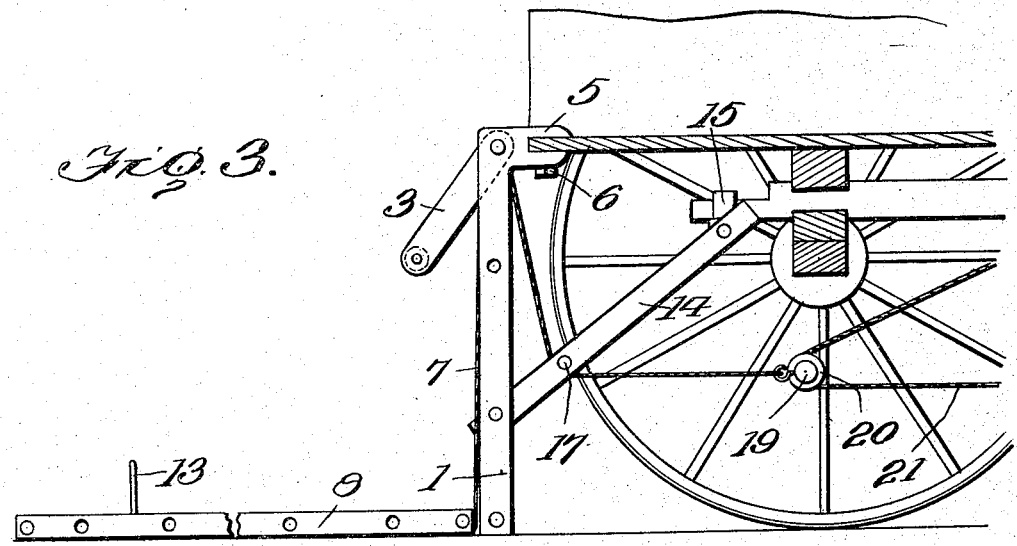
Figure 4:
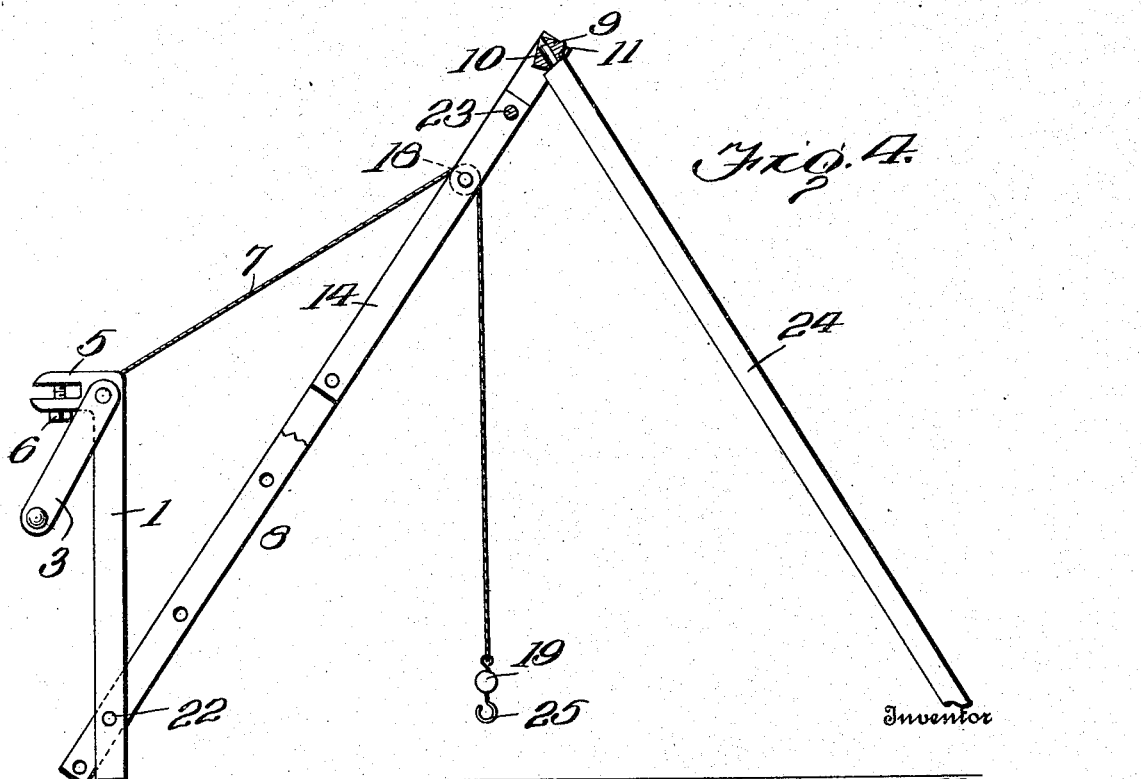
Figure 1:
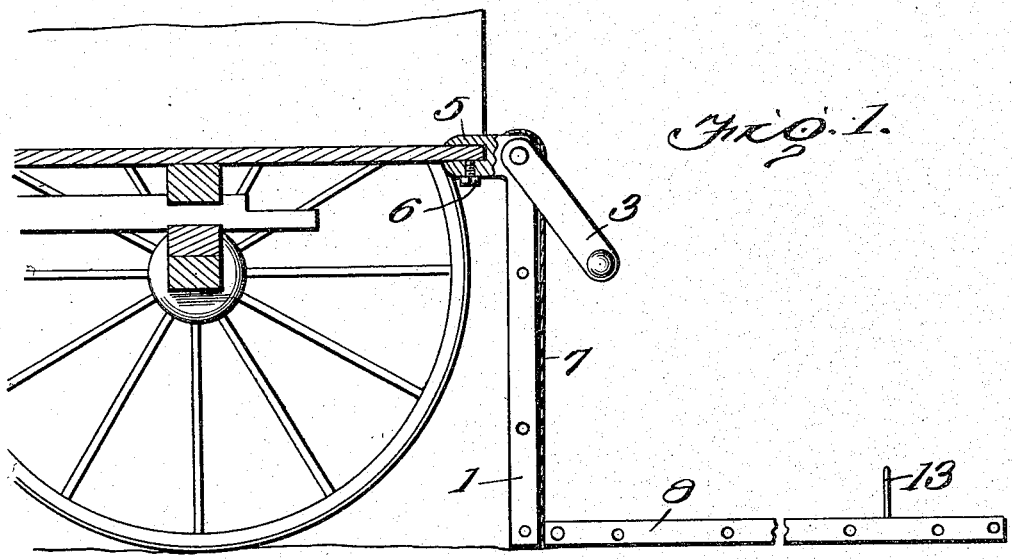
Figure 2:
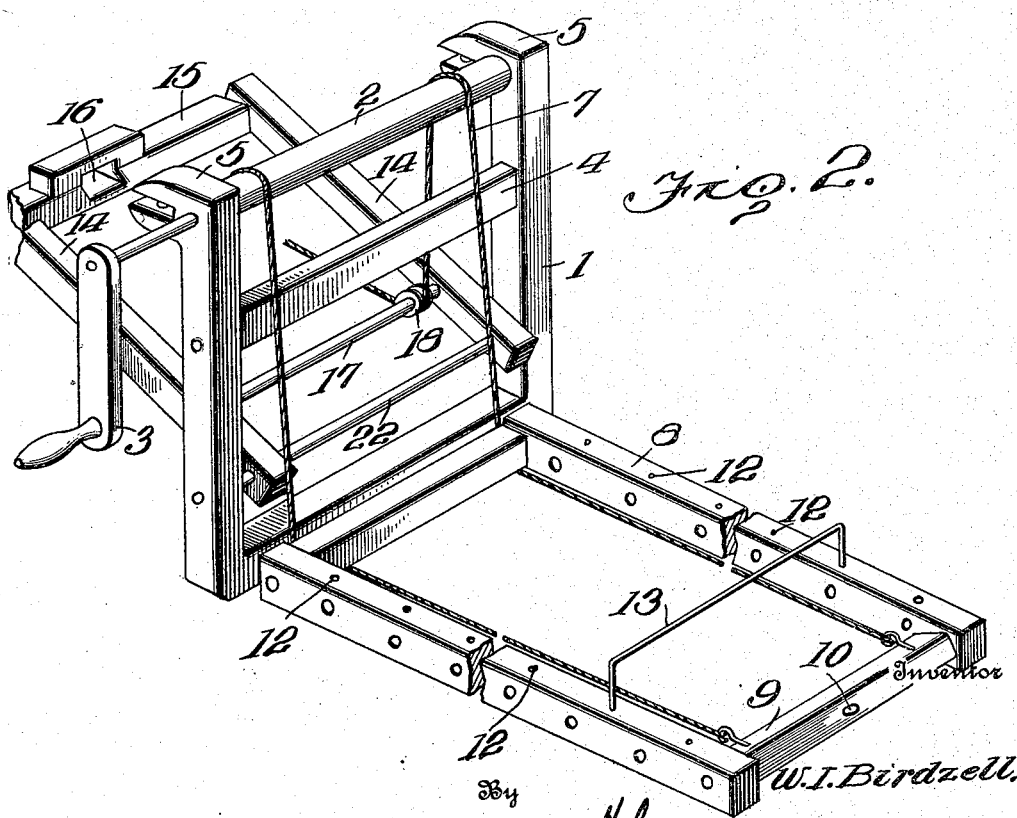

In the accompanying drawings: Figure 1 is a sectional elevation of the device in operative relation to a wagon box; Fig. 2 is a perspective view showing a further adaptation of the invention; Fig. 3 is a view similar to Fig. 1, illustrating the form shown in Fig. 2 arranged in connection with a wagon box; and Fig. 4 is a view showing the device arranged as a derrick.

In carrying out my invention, I employ a U-shaped bar or frame 1 having journaled in the upper ends of its side portions a roller 2 which is equipped with an operating crank or handle 3 at one end. A cross bar or brace 4 may be extended between the sides of this frame or U-bar so as to impart rigidity to the structure, as will be readily understood. On the sides of the said frame, near the upper ends thereof, are projections or lugs 5 which are notched or bifurcated, as shown, to engage the bottom of a wagon box and are equipped with set-screws 6 which may be turned home against the under side of the wagon box so as to secure the frame fixedly thereto. Cables 7 are secured to the roller 2 in the simple form shown in Fig. 1 and pass thereover to the bottom of the frame where they are extended under a platform or lifting frame 8. The said frame or platform 8 comprises longitudinal side bars connected by cross bars of any desired number and dimensions, and the ends of the cables 7 are secured to the outermost cross bar 9, as will be readily understood. This outermost cross bar is also constructed with a socket 10 and a beveled face 11 for a purpose hereinafter set forth, and in the side bars I provide longitudinal series of sockets 12 to receive the legs of a bail or other stop device 13 which is set against the load to prevent dislodgment of the same while it is being lifted into the wagon.

The use of the structure thus far described, and illustrated in Fig. 1, will be readily understood.

The boxes, bundles or other material to be loaded into the wagon are placed upon the platform or frame 8 and the main frame 1 is secured to the bottom of the wagon box by means of the lugs 5 and set-screws 6, as will be readily understood. The crank handle 3 being then rotated, the cables 7 will be wound upon the roller 2 and will, of course, be drawn toward the said roller from the outer end of the frame 8. Inasmuch, however, as the outer free ends of the cables are secured to the said lifting frame, the inner end of the frame will be raised and the frame tilted until the inner end of the same reaches the height of the roller 2, after which the frame will be caused to ride inwardly over said roller into the wagon box and carry the load into the same, the bail, stop or other form of load-retainer preventing the load slipping from the frame when the same is tilted. The cables may then be detached and the frame withdrawn, as will be understood. Should the frame be left within the wagon under the load, it may be withdrawn by use of the roller 2, if the cables be passed under the load by means of a thin board or similar implement and then secured to the front end of the frame.

It will be readily noted that the stop or load-retainer 13 may be placed at various distances from the end of the platform according to the size of the load. It is important that the load be placed as far forward (that is, toward the frame 1) as possible so that as soon as the load has been raised above the roller 2 it will overbalance the outer portion of the platform and swing down to and over the roller and begin to move into the wagon box.

In Figs. 2 and 3, I have shown a further development of the invention, in which a supplemental supporting frame is connected to the frame 1, this supplemental frame consisting of side bars 14 and a cross bar 15 which is adapted to bear against the perch or coupling pole of the wagon, the side bars extending obliquely upward from the lower portion of the main frame 1. An opening 16 is provided in the cross bar 15 to engage the end of the perch and prevent lateral movement of the supplemental frame, as will be readily understood. A rod 17 is provided in this supplemental frame, and pulleys 18 are mounted upon the said rod, the cables in this instance being passed upwardly over the roller 2 and then down to and under the rollers or pulleys 18 and secured to a bar or rod 19, as shown in Fig. 3. A pulley 20 is fitted upon this rod 19, and hauling cable 21 is passed around the said pulley. One end of this cable 21 is secured to the wagon bed near the front end thereof, and the other end of said cable is equipped with whiffletrees or other draft devices so that a draft team may be harnessed thereto and then driven forward so as to haul the rod 19 and the cables thereby causing the frame 8 to pass into the wagon box in the same manner as described in connection with Fig. 1. It will be noted that the side bars 14 of the supplemental frame fit between the sides of the frame 1 and a long pin or rod 22 is inserted in said side bars and the sides of the main frame to prevent dropping of the supplemental frame and connect the same to the main frame.

In Fig. 4, I show the device arranged as a derrick. The supplemental frame is secured in the upper end of the frame 8 by a pin or rod 23 inserted through the side bars of the two frames, a similar rod being inserted through said side bars near the lower ends of the bars 14 and said frame 8 is arranged in an inclined position and supported in said position by a prop 24. The frame 1 is arranged at the lower end of the frame 8 and secured thereto by the pin or rod 22 and the cross bar of said frame 1 will rest on the ground so as to furnish an additional support. The cables are secured to the roller 2 and passed over the pulleys 18 and suspend the bar 19 therefrom, hooks 25 being added to the said bar to engage the article to be raised. The upper end of the prop 24 is provided with a tenon to engage the socket 10, the end of the prop, around the base of the tenon, fitting against the beveled face 11. It will be noted that the cross bar or base of the U-shaped frame rests on the ground and passes under the side bars 8 so that the side bars will tend to hold the U-shaped frame against strain exerted thereon through the cable and to further aid in resisting the strain the parts may be anchored in any convenient manner.

It will be readily noted that I have provided an exceedingly simple apparatus which may be easily set up for a variety of uses and which may be manufactured at a low cost. The operation of the device is very simple and easy, and it contains no complicated arrangement of parts which are liable to get out of order and necessitate frequent repairs.

Having thus described the invention, what is claimed as new is:—

1. In an apparatus for the purpose set forth, a frame comprising side bars provided at their upper ends with spaced projections adapted to engage the floor of a wagon box, means co-acting with said projections to secure the frame to the wagon box, a roller mounted in the upper portion of said frame, a lifting frame disposed laterally with respect to the main frame and a cable passing over said roller and connected to the lifting frame to cause longitudinal lifting movement thereof.

2. The combination of a frame adapted to engage a wagon box, a roller on said frame, a lifting frame disposed laterally with respect to the first-mentioned frame, a cable passing from the said roller under the lifting frame and secured to the outer end thereof, and means for drawing upon said cable to raise the lifting frame and cause the same to move forwardly over the roller.

3. An apparatus for the purpose set forth comprising a lifting frame, a supporting frame arranged at one end of the lifting frame, a roller on the supporting frame, a supplemental frame disposed at an angle to the supporting frame, pulleys mounted on the supporting frame, cables secured to the outer end of the lifting frame and passing under the same and over the roller on the supporting frame and under the pulleys on the supplemental frame, a hauling bar secured to the ends of the cables, and means for applying draft to said bar.

4. An apparatus for the purpose set forth comprising an upright frame, a load-sustaining frame having longitudinal series of sockets in the upper side, means for causing said load-sustaining frame to rise to and pass over said upright frame, and a transverse load-retaining bail having its ends adapted to engage the sockets in the load-sustaining frame.

In testimony whereof I affix my signature in presence of two witnesses.

WILLIAM I. BIRDZELL. [L. S.]

Witnesses:
R. E. ZENKE,
R. O. BLOCK.

Copies of this patent may be obtained for five cents each, by addressing the "Commissioner of Patents, Washington, D. C."